United States Patent Office 2,706,204
Patented Apr. 12, 1955

2,706,204

PROCESS FOR PRODUCING OXIMES

Kurt Kahr, Ems, Switzerland, assignor to Inventa A.-G., fur Forschung und Patentverwertung Luzern, Luzern, Switzerland No Drawing. Application September 23, 1952, Serial No. 311,169

9 Claims. (Cl. 260—566)

This invention is a novel process for producing oximes in a commercial manner. Prior to the present invention oximes were manufactured prevailingly by treating oxo compounds with hydroxylamine or salts thereof. This known method of manufacture is not advantageous, for one reason, because hydroxylamine is difficult to obtain. Also, in the prior process, there are formed large quantities of neutral salts such as, for example, sodium sulphate or ammonium sulphate. A general object of this invention is to obviate the recited disadvantages by the use of a new synthesis of the oximes.

Bamberger and his co-workers, see B.33, 1782 (1900) and subsequent publications, have oxidized primary amines to yield oximes by means of neutralized sulphomonoper-acid. Later, it was found that, with hydrogen peroxide, primary amines form hydro-peroxide addition compounds, which are usually unstable and are not oxidized at low temperatures, while higher concentration of the hydrogen peroxide and higher temperatures lead to oxidation products which are difficult to define, see Ind. Eng. 39, 1536 (1947).

It has now unexpectedly been found that oximes can be obtained by treating a primary amine, the amine group of which is attached to a primary or secondary carbon atom, with hydrogen peroxide in the presence of a salt of an acid of tungsten, molybdenum or uranium as catalyst, to form a corresponding aldoxime or ketoxime. Of the above-mentioned amines, both saturated and unsaturated compounds can be used, the amine group of which is attached to an aliphatic or alicyclic radical. The amines used should be in pure form. For oxidation of the amines there may be used dilute or concentrated hydrogen peroxide, and 30 to 35 percent by weight of such hydrogen peroxide can also be directly made in the amine-free catalyst solution which is introduced into the circuit.

Suitable examples of catalysts to promote the oxidation may include tungstates, molybdates, uranates or the corresponding per-salts, and particularly the alkali metal and ammonium salts as well as the salts of the amines used. The latter can be obtained by dissolving the said acids in the aqueous amine solutions.

Salts which are the more easily soluble in water are more particularly suited for the oxidation of the amines. The salts of per-uranic acid are only slightly soluble even at elevated temperatures and, therefore, have less catalytic effect. Of the above-mentioned salts the tungstates have the most effective catalytic action and even 0.01 mol is sufficient, for example, for the oxidation of 1 mol of cyclohexylamine to cyclohexanone oxime. The catalysts also cause some decomposition of the hydrogen peroxide, but this reaction proceeds more slowly than the oxidation of the amines, so that therefore the loss of hydrogen peroxide by decomposition is not excessive. The decomposition of the hydrogen peroxide is greatly influenced by the reaction temperature, and also by the amount of catalyst, as well as by the amount of hydrogen peroxide. Increase in the reaction temperature or in the amount of catalyst, or in the amount of hydrogen peroxide, above the amount necessary for the oxidation, effects an increase in the decomposition of the hydrogen peroxide.

It is found advantageous to use as small a quantity of catalyst as possible, consistent with effectiveness, because an increased amount of catalyst promotes the formation of by-products and the decomposition of the hydrogen peroxide. A definite minimum amount of catalyst is naturally necessary in order to ensure the reaction within the desired period of time. If the amount of catalyst is increased above this minimum amount, when determined, the amount of amine converted is no longer increased; this relation being preferably a critical or optimum one.

The conversion of the amine by hydrogen peroxide in the presence of the aforesaid catalysts is preferably carried out in aqueous solution in excess of the amine.

In the oxidation of amines in the presence of molybdates and uranates as catalysts, it is advantageous and preferred to use these catalysts with only a small quantity of water or sometimes with no water at all. In this latter case the water which is present in the 30 to 35 percent hydrogen peroxide is sufficient for the reaction.

The reaction recited can also be carried out in the presence of organic solvents which are miscible with water and which have a good solvent power for the oximes and which do not react with the other components of the reaction mixture; for example monohydric alcohols. This is particularly advantageous when the oximes are either insoluble or difficultly soluble in water. In this case there should be used at the most such an amount of the organic solvent as is necessary to bring the formed oxime into the solution.

Preferably, the oxidation is carried out either by adding the whole amount of the amine and of the hydrogen peroxide one after the other to the catalyst solution, or by adding a part of the amine and then adding the remainder of the amine and the hydrogen peroxide solution in equivalent molecular proportions. It is not necessary to treat the amine in anhydrous form, it can be added in the form of a solution in water or in the above-mentioned organic solvents. The concentration of the amine in the finished reaction solution should preferably be kept between 10 and 50 percent. The reaction is carried out in an atmosphere which is as free as possible from carbon dioxide, as the amines form amine carbonates with avidity. The stirring should not be too vigorous in order that as little oxygen as possible may be lost.

The oxidation of the amine is exothermic, tending to raise the reaction temperature, which should be substantially constant. Therefore in order to maintain such constant temperature, the reacting materials must be stirred or agitated and cooled. The reaction temperature should be kept as low as practical in order to suppress or reduce the formation of by-products. It must, however, not be too low otherwise the speed of the reaction may be reduced too much. With the same amine, the reaction temperature when using tungstates and molybdates as catalysts is lower than when using an uranate. For example, cyclohexylamine is most advantageously treated at a temperature of 15° C. in the presence of a tungstate or molybdate and at 60° C. in the presence of a uranate. With amines which boil at a low temperature the reaction temperature can be lowered to the freezing point of the reaction solution, particularly if the concentration of the amine or of the catalyst is relatively high. The optimum temperatures for different reactions are readily determinable.

At the temperatures above indicated, the speed of the reaction is, in general, so great that a reaction time of 1 to 2½ hours is sufficient, and therefore the process may readily be executed substantially continuously. For this purpose it is an advantage to allow the reaction components to flow together during a period of 1 to 2 hours and to bring the reaction to completion by stirring for a further half hour at least, at this temperature.

The yield from one mol of amine and two mols of hydrogen peroxide amounts, under the aforesaid reaction conditions, to about 81 percent, calculated on the amine used.

The almost complete conversion of the amine can be obtained only by using a large excess of hydrogen peroxide, but, in this case, increased amounts of byproducts are formed.

Referring again to the maximum amount of catalyst above which no further amine is converted, this depends upon the particular kind of catalyst employed; for tungsten for example the maximum would be 0.04 mol of tungstate per mol of amine; while the minimum amount of catalyst would be 0.01 mol per mol of amine.

Thus, hydroxamic acids and aldehydes are formed as byproducts from the amines with the amine group attached to a primary carbon atom, and ketones are mainly formed from amines with the amine group attached to a secondary carbon atom.

The amount of the byproducts depends upon the kind of amine used and also upon the reaction conditions and factors, such as the molecular proportions of the components, the temperatures and time. The low molecular, low boiling amines give a greater amount of byproducts. More byproducts are produced during the formation of aldoximes than during the formation of ketoximes. When an insufficient amount of hydrogen peroxide is used, both the amount of conversion of the amine and the loss of hydrogen peroxide are less. Thus, for example, in the case of cyclohexylamine, with an insufficiency of hydrogen peroxide of 10 to 20 percent, only about 1 percent of oxidation products, other than oximes, is formed.

The reaction mixture contains the oxime as well as unconverted amines, a small amount of byproducts, and a small amount of free and combined hydrogen peroxide, calculated on the amount of hydrogen peroxide added. In the case of oximes which are insoluble or difficultly soluble in water, for example butyraldoxime, benzaldoxime, cyclohexanone oxime, the oxidation of the amine in accordance with the invention can also be carried out in two steps, provided the above-mentioned organic solvents are not added or are added in quantity insufficient to dissolve the oxime. In this 2-stage case, in the first stage the oxidation is carried out only with so much hydrogen peroxide that half the maximum amount of oxime obtainable is formed from corresponding amine. In this way the amines react easily, with the formation of amine-oxime addition compounds which separate from the reaction solution. After this oxidation stage the oxidation with hydrogen peroxide proceeds with greater difficulty and leads to the aforesaid byproducts. By the addition of a definite and suitable amount of the abovementioned solvents, the amine-oxime can be partially or completely dissolved and split up and the oxidation can thus proceed further.

The oxidation to the amine-oxime addition compounds is particularly suitable when the conditions of the reaction give rise to an increased formation of byproducts. Theoretically one mol amine reacts with one mol hydrogen peroxide forming one mol amine-oxime addition compound. In practice such a reaction, as well as the oxidation with 2 mols hydrogen peroxide, does not proceed quantitatively, and the conditions regarding the amount of hydrogen peroxide, and the factors of temperature and time, correspond to those with the double amount of hydrogen peroxide.

The difficultly soluble amine-oxime addition compounds separate out during the reaction in pure form. These are well defined liquid or crystalline compounds at room temperature. Thus, for example, the cyclohexylamine-cyclohexanone oxime addition compound separates in the form of fine white needles which contain water and melt at a temperature of about 30° C. The amine-oxime addition compounds have a strongly alkaline reaction and easily split up in solution or at an elevated temperature decompose into their components.

In order to promote the separation of the amine-oxime addition compounds in the reaction solution there may be added to the catalyst solution suitable substances which separate the oxime from the aqueous solution, for example, neutral salts such as common salt or sodium sulphate, or organic compounds such as polyhydric alcohols, such as glycerine, and so forth. The substances added must not, of course, react with the components of the reaction and may be used only in such quantities that no separation or splitting of the amine or of the catalyst occurs.

The reaction solutions are worked up by separating the undecomposed amine and the oxime. In the case of reaction solutions containing solvents the solvent can first be removed, for example by distillation, if necessary under reduced pressure. Before the distillation it is advantageous catalytically to decompose the small remainder of undecomposed hydrogen peroxide. During the distillation of the solvent a part of the amine usually passes over with it. The amine-containing solvent can be returned to the process for further reaction. The oxime, the amine and the dissolved catalyst remain in the reaction solution.

The separation of the undecomposed amine from the reaction solution can take place either separately or together with the separated oximes or amine-oxime addition compounds. The separation of the oxime and the amine from the reaction solution can also be effected by extraction. It is advantageous to separate mechanically and separately work up the oxime or amine-oxime addition compounds which are insoluble, or difficultly soluble, in water, for which purpose the reaction solution is suitably cooled to about 0° C.

The separation or splitting of the amine from the oxime can be effected either by neutralizing the amine with acids or by distillation.

Distillation can take place either azeotropically with water or non-azeotropically, depending on whether or not the amine boils azeotropically with water. The amines can be rectified and distilled in a simple manner because their boiling point, or the boiling point of the waterazeotrope, is below that of the corresponding oxime, so that a quantitative separation of the oxime is possible. The distillation of the amine can take place under normal or under reduced pressure. It is advantageous to work with a temperature which is not too high, because the oximes decompose at elevated temperatures, below which the solution should be kept. Therefore, in all cases it is advantageous to carry out the distillation in the presence of water. It is not necessary, to distil the oximes azeotropically with water, since an oxime can be salted out or extracted from the distillation residue. After the separation of both the amine and the oxime from the reaction solution, a part of the water can be removed by distillation or freezing in order to bring the catalyst solution again to the original volume, and the solution can then be returned to the process. The catalyst can be recovered by precipitation with strong mineral acids.

After return of the amine to the process there is obtained, for example in the case of cyclohexylamine, a pure oxime in a yield of at least 97 percent, calculated on the amine used. The conversion of the amine by hydrogen peroxide in the presence of catalysts can be carried out continuously without difficulty. The alicyclic ketoximes, for example, which are manufactured in this manner, can, after dehydration, be converted by the Beckmann transposition into the corresponding ω-lactams.

EXAMPLES

The process will now be explained with the aid of the following examples which are illustrative but not limitative of the invention in any way. In the examples, the parts mentioned are parts by weight and the percentages are percentages by weight, and all stated magnitudes are to admit of minor variations.

Example 1

About 59 parts of isopropylamine are dissolved in 88.5 parts of 7.5 percent sodium tungstate solution; and 219.6 parts of 29 percent hydrogen peroxide solution are added progressively during the course of 2½ hours, at a temperature of 5° C., while stirring and cooling. After the addition of hydrogen peroxide is completed the mixture is stirred for a further 30 minutes at 5° C. The reaction solution is cooled with ice and neutralized exactly with sulphuric acid and then repeatedly extracted with ether. From the extract 47 parts of acetoxime of a melting point of 60° C. are obtained. This fulfills the object of producing oximes, in this case starting with the specified amine.

Example 2

To a mixture of 73.1 parts of an n-butylamine and 109 parts of 12.2 percent sodium tungstate solution there are added 219.6 parts of 29 percent hydrogen peroxide solution at a temperature of 15° C. and during the course of 1¾ hours while slowly stirring and cooling. During the reaction 105 parts of ethanol are added in successive portions in order to avoid formation of an emulsion. After the completion of the additions, stirring is continued at 15° C. for a further period of from one half to one hour. The reaction solution is neutralized with sulphuric acid cooled, and is freed from the added ethanol by distillation in vacuum. After salting out the solution which remains behind with common salt, there are obtained 50 parts of n-butyraldoxime, which is an oxime in the form of an oil having a boiling point of 152° C., thus answering the purpose of the invention.

Example 3

About 53.6 parts of benzylamine are mixed with 80 parts of 8.3 percent sodium tungstate solution while cooling; and 109.8 parts of a 29 percent hydrogen peroxide solution are added at a temperature of 15° C. during the course of from 1 to 1½ hours while stirring and cooling. The formation of an emulsion is prevented by the addition of 213 parts of methanol in successive portions. The mixture is allowed to react for a further half hour at the reaction temperature. The reaction solution is then neutralized with sulphuric acid while being cooled and freed from the added methanol or alcohol by distillation in vacuum. There is obtained as residue 38.9 parts of benzaldoxime in the form of an oily layer. Thus again the objects of the invention are attained, by the process of this example.

Example 4

About 20 parts of cyclohexylamine are dissolved in 400 parts of 0.75 percent sodium tungstate solution, and thereinto are run 80 parts of cyclohexylamine and 78 parts of 35 percent hydrogen peroxide solution at a temperature of 15° C. while stirring and cooling during the course of one hour. The mixture is then stirred for a further half hour at this temperature, after which the reaction mixture is cooled to 0° C. and the resulting cyclohexylamine-cyclohexanone-oxime crystals which separate out are removed.

About 31 parts of unreacted cyclohexylamine and 3 parts of oxime remain behind in the filtrate. The amine-oxime crystals are now mixed with about 150 parts of water and the cyclohexylamine is separated out from this mixture by distillation of the water-azeotrope. There is obtained as a distillate 84 parts of approximately 40 percent cyclohexylamine and, as residue, pure aqueous cyclohexanone-oxime which gives 40 parts of anhydrous cyclohexanone-oxime having a melting point of 88° C. This answers the stated aim of the invention.

Example 5

To a mixture of 50 parts of cyclohexylamine and 30 parts of 8.3 percent sodium molybdate solution there are added at a temperature of 15° C. and during the course of 2½ hours, 97 parts of 35 percent hydrogen peroxide solution and 66.5 parts of methanol, while stirring and cooling; afterwards the mixture being allowed to react for a further three hours at 15° C. The methanol added is separated from the reaction solution by vacuum distillation. After cooling of the residual solution, cyclohexanone-oxime and the amine-oxime compound separate out as crystals, and these are separated by steam distillation into 15.5 parts of undecomposed cyclohexylamine as distillate, and 35 parts of cyclohexanone-oxime as residue; accomplished by this example of the invention.

Example 6

About 50 parts of cyclohexylamine are added to a freshly precipitated uranium peracid which has been obtained from 10 parts of 43 percent uranyl-nitrate solution and 5 cc. of 10 percent hydrogen peroxide solution, and thereinto are run 58.5 parts of 35 percent hydrogen peroxide solution while stirring during the course of one hour at a temperature of 60° C. The reaction mixture is allowed to stand at this temperature for a further half hour to complete the reaction and is then neutralized with sulphuric acid, and after cooling 9.6 parts of cyclohexanone-oxime separate out. Q. E. F.

Example 7

Into the first of three reaction vessels, which are arranged in series, and each of which has an effective capacity of 500 parts by volume, and is provided with a cooling means or device, and with a slowly running stirrer, and is charged with the reaction mixture of the cyclohexylamine oxidation and kept at a temperature of 15° C., there are run per hour a mixture of 175 parts of 57 percent aqueous cyclohexylamine solution and 225 parts of a 2.6 percent sodium tungstate solution and 32 parts of methanol, and 39 parts of 35 percent hydrogen peroxide solution and these are run in separately per hour. From this first reaction vessel the reaction mixture flows into the second reaction vessel, into which 39 parts of 35 percent hydrogen peroxide solution are run per hour. From the second reaction vessel the reaction mixture flows to the third reaction vessel into which 39 parts of 35 percent hydrogen peroxide solution are run per hour.

Finally, 549 parts of a crystal-containing reaction mixture are run out per hour from the third and last reaction vessel into a cooling vessel in which the mixture, while being stirred, is cooled down to 0° C. Then the separated amine-oxime crystals are continuously centrifuged and mixed with 100 parts of hot water per hour, and this mixture is supplied to a vacuum distillation column.

As the head product, as at the top of the column, there is drawn off per hour 95 parts of approximately 40 percent cyclohexylamine azeotrope. At the foot of the column an aqueous mixture of 43 parts cyclohexanone-oxime flows out and away per hour.

The centrifuged solution also contains about 12 parts of undecomposed cyclohexylamine and about 10 parts of cyclohexanone-oxime. From this solution are frozen out per hour, in the form of ice, about 200 parts of water by cooling to a temperature of $-6°$ to $-8°$ C. The remaining methanol-containing aqueous catalyst solution and the cyclohexylamine-water azeotrope from the distillation are returned to the reaction vessel for oxidation and supplemented with fresh cyclohexylamine. In this way cyclohexanone-oxime is obtained in a yield of about 97 percent. This seventh example may be operable as a continuous system.

By way of review of certain aspects the following may be considered as preferred features, emphasized in certain of the claims, as follows: The invention thus considered is (1) a process for the production of oximes, wherein a primary amine, the amino group of which is attached to a primary (or a secondary) carbon atom, is treated with hydrogen peroxide in the presence of a salt of an acid of tungsten, molybdenum or uranium as a catalyst. The process may yield an isolated oxime or the oxime may be in combination with other compounds. The following items or subfeatures may be present: (2) The oxime may be obtained as a solution; (3) It may be kept in solution by an added organic solvent; (4) The reaction temperature should be between the freezing point of the solution and 60° C.; (5) The oxidation of the amine may be performed in two stages with an amine-oxime addition compound being formed in the first stage; (6) The process may be continuous, in which case the undecomposed amine and the catalyst are preferably returned to the process, as to the first stage; (7) The amine used in the process may be cyclohexylamine; (8) In this item cyclic primary amines are treated with hydrogen peroxide in the presence of tungstates as catalysts, until the amine-oxime compound is formed; (9) In practicing the preceding item there may be added indifferent or neutral salts that are water-soluble to the solution of the catalyst in water; (10) For any item the amine used may be isopropylamine; (11) Likewise the amine may be n-butylamine; (12) The amine may be benzylamine; (13) The various oximes obtained by the process are in some cases novel per se; (14) The general description of the process of the invention is accompanied by seven specific examples designated as Examples 1, 2, 3, 4, 5, 6 and 7, each of which is hereby claimed per se as novel, useful and inventive.

What is claimed is:

1. The process of producing oximes which comprises reacting an amine of the class consisting of a primary amine having an amino group attached to a primary carbon atom and a primary amine having an amino group attached to a secondary carbon atom, with hydrogen peroxide in the presence of a catalyst comprising the salt of an acid of a metal of the class or group consisting of tungsten, molybdenum and uranium.

2. The process as defined in claim 1, wherein the catalyst is a salt of a peroxy acid of a metal of the class consisting of tungsten, molybdenum and uranium.

3. The process as defined in claim 1, wherein the primary amine is in basic solution when treated with the hydrogen peroxide.

4. The process as defined in claim 1, wherein the organic radical attached to the amino group of the amine is a hydrocarbon radical.

5. The process as defined in claim 1, wherein the primary amine is an alicyclic amine.

6. The process as defined in claim 1, wherein the primary amine is an alkyl amine.

7. The process as defined in claim 1, wherein there is present in the reaction zone an organic solvent for the oxime produced, miscible with water to dissolve the oxime as it is produced.

8. The process of producing oximes which comprises partially oxidizing an amine of the class consisting of a primary amine having an amino group attached to a primary carbon atom and a primary amine having an amino group attached to a secondary carbon atom, with hydrogen peroxide in the presence of a catalyst comprising the salt of an acid of a metal of the class consisting of tungsten, molybdenum and uranium, to produce an amine-oxime addition compound, separating the amine and oxime components of this compound and oxidizing the separated amine component of said addition product by means of hydrogen peroxide in the presence of a catalyst comprising a salt of an acid of a metal of the class consisting of tungsten, molybdenum and uranium to produce oxime.

9. The continuous process of producing oximes which comprises partially oxidizing an amine of the class consisting of a primary amine having an amino group attached to a primary carbon atom and a primary amine having an amino group attached to a secondary carbon atom, with hydrogen peroxide in the presence of a catalyst comprising the salt of an acid of a metal of the class consisting of tungsten, molybdenum and uranium to produce an amine-oxime addition compound in a reaction zone, separating the amine and oxime components of this compound and recovering the amine component outside of said reaction zone, and continuously returning the recovered amine to said reaction zone for oxidation by the hydrogen peroxide therein to produce oxime.

References Cited in the file of this patent

Houben, "Die Methoden der Organischen Chemie," 3rd ed., vol. 2 (1943), pp. 27, 176 and 177.